Figure 1:
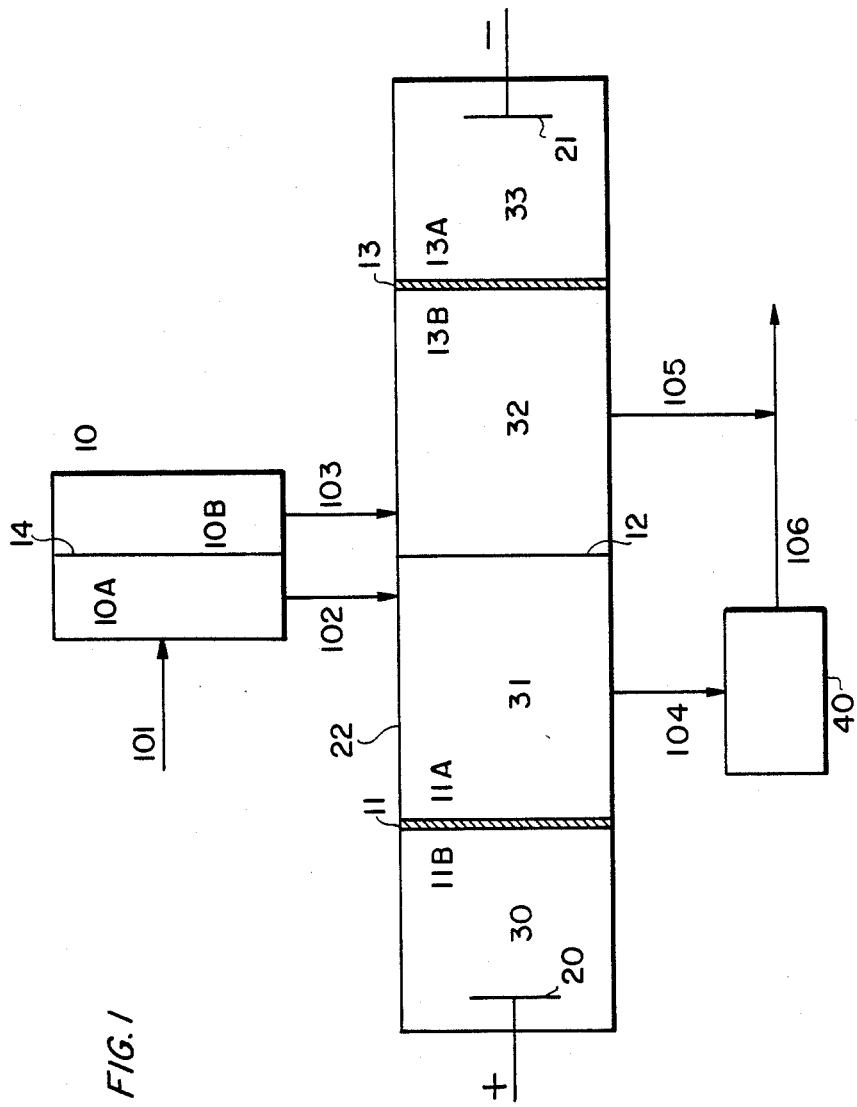

United States Patent [19]

Hatzidimitriu et al.

[11] Patent Number: 4,880,647

[45] Date of Patent: Nov. 14, 1989

[54] PROCESS FOR MILD HEAT TREATMENT OF CONCENTRATED FLUIDS FROM MEMBRANES

[75] Inventors: Stratos E. Hatzidimitriu, San Jose, Calif.; W. Reginald Hall, Winnetka, Ill.

[73] Assignee: FMC Corporation, Chicago, Ill.

[21] Appl. No.: 321,944

[22] Filed: Mar. 10, 1989

[51] Int. Cl.$^4$ .......................... A23L 2/30; B01D 13/02
[52] U.S. Cl. ............................ 426/239; 204/138; 204/182.4; 210/650; 426/330.5; 426/599
[58] Field of Search ............... 426/239, 599, 330.5, 426/521; 204/182.4, 138; 210/650, 748

[56] References Cited

U.S. PATENT DOCUMENTS

| | | | |
|---|---|---|---|
| 512,133 | 1/1894 | Weyde et al. | 204/138 |
| 751,179 | 2/1904 | Kollrepp et al. | 204/138 |
| 1,256,758 | 2/1918 | Williams | 204/138 |
| 1,915,568 | 8/1928 | Gortner et al. | 426/239 |
| 1,972,561 | 3/1932 | Heubaum | 204/138 |
| 2,089,116 | 8/1937 | Dyckerhoff | 426/239 |
| 2,159,074 | 5/1939 | Briggs | 204/138 |
| 2,631,100 | 3/1953 | Aten et al. | 99/451 |
| 2,671,055 | 3/1954 | Aten et al. | 204/131 |
| 2,688,572 | 9/1954 | Warshaw | 127/54 |
| 2,830,905 | 4/1958 | Block et al. | 426/239 |
| 3,165,415 | 1/1965 | Kilburn et al. | 426/239 |
| 3,201,245 | 8/1965 | Clark et al. | 426/239 |
| 3,290,173 | 12/1966 | Marino | 127/63 |
| 3,369,906 | 2/1968 | Chen | 426/239 |
| 3,433,726 | 3/1969 | Parsi et al. | 204/301 |
| 3,447,930 | 6/1969 | Francis | 99/57 |
| 3,475,216 | 10/1969 | Walon | 127/46 |
| 3,547,657 | 12/1970 | Otsuka et al. | 99/485 |
| 3,666,647 | 5/1972 | Kubo et al. | 204/180 P |
| 3,687,682 | 8/1972 | Scheder | 426/239 |
| 3,709,802 | 1/1973 | Okuhara et al. | 426/239 |
| 3,781,174 | 12/1973 | Nishijima et al. | 127/42 |
| 3,845,226 | 10/1974 | Goujard | 426/239 |
| 3,865,960 | 2/1975 | Wucherpfennig et al. | 426/239 |
| 3,968,017 | 7/1976 | Canata et al. | 204/182.4 |
| 4,138,501 | 2/1979 | Chaveron et al. | 426/329 |
| 4,160,713 | 7/1979 | Matsuzaki et al. | 204/180 P |
| 4,212,891 | 7/1980 | Fujita et al. | 426/321 |
| 4,264,631 | 4/1981 | Rose | 426/247 |
| 4,317,841 | 3/1982 | Brambilla et al. | 426/329 |
| 4,322,448 | 3/1982 | Matsuura et al. | 426/490 |
| 4,374,714 | 2/1983 | Hekal | 204/131 |
| 4,401,678 | 8/1983 | Beaumont | 426/15 |
| 4,492,601 | 1/1985 | Nakasone et al. | 127/48 |
| 4,523,959 | 6/1985 | Exertier | 127/46 |
| 4,539,212 | 9/1985 | Hunter | 426/123 |
| 4,643,902 | 2/1987 | Lawhon et al. | 426/271 |
| 4,670,125 | 6/1987 | Mueller et al. | 204/296 |
| 4,758,320 | 7/1988 | Sanchez et al. | 210/650 |
| 4,766,161 | 8/1988 | Chlanda et al. | 521/27 |

OTHER PUBLICATIONS

Fennema, "Principles of Food Science", Food Chemistry, Part I, Marcel Dekker, Inc., New York, 1976, pp. 466–467.

Primary Examiner—George Yeung
Attorney, Agent, or Firm—R. E. Elden; A. J. Moore

[57] ABSTRACT

A process is provided for reducing the concentration of microbial cells in a flowable fluid by dividing the fluid into a sterile permeate and a retentate reducing the pH of the retentate in an electrolytic cell, heating the retentate to reduce the concentration of microbial cells therein and increasing the pH of the permeate in an electrolytic cell and combining the retentate and permeate.

2 Claims, 1 Drawing Sheet

PROCESS FOR MILD HEAT TREATMENT OF CONCENTRATED FLUIDS FROM MEMBRANES

A process is provided for reducing the concentration of viable microbial cells or enzymes in a flowable fluid by dividing the fluid into a sterile permeate and a retentate reducing the pH of the retentate in an electrolytic cell, heating the retentate to reduce the concentration of viable microbial cells or enzymes therein and increasing the pH of the permeate in an electrolytic cell and combining the retentate and permeate.

Acidity is an important factor that can affect processing characteristics, storage stability, and organoleptic attributes of food and other products. Acidity in aqueous fluids is frequently measured by pH, the negative logarithm of the hydrogen ion concentration.

Acids, such as citric, have been added to some moderately acid fruits and vegetables to lower the pH to a value below 4.5 permitting sterilization to be achieved under less severe thermal conditions than otherwise necessary. However, the reduced pH often adversely affects the taste of food and the stability, color and physical properties of products and the acid constitutes an "additive".

U.S. Pat. No. 3,165,415 discloses an electrodialysis method to adjust the acidity in juices. However, this method involves transfer of additive species into the juice stream, and removal of other species from the juice.

It has been recognized for a long time that the pH of a solution can be changed by electrodialysis, transfer of hydrogen ions or hydroxyl ions through a porous diaphragm. For example, U.S. Pat. No. 751,179 teaches that alkali ions can be removed from an aqueous sugar solution in an anode compartment by electrodialysis. However, the process forms acids at the anode which must be removed by adding lead saccharate, thereby neutralizing the acid formed.

Three compartment electrodialysis cells with the solution to be treated in the intermediate cell without an electrode avoid the problems of changing the composition of the fluid by oxidation reactions at the anode or reduction reactions at the cathode. However, even when compartments are separated with anion permeable membranes or cation permeable membranes as in U.S. Pat. No. 3,369,906 there is a disadvantage in that ions transferred into the solution from the adjacent compartment are "chemical additives". Further, the process can result in inadvertent contamination from a solution in an adjacent compartment. U.S. Pat. No. 4,317,841 combines the use of chitosan, an amino-bearing polysaccharide, with electrodialysis. Such a process while effective for deacidifying coffee is not useful for increasing the acidity (lowering the pH) of a flowable fluid or of a fluid containing suspended matter such as fruit pulp.

U.S. Pat. No. 3,968,017 teaches cation permeable membranes are useful in electrodialysis cells to convert solutions of sodium citrate to citric acid. While the process is effective in the manufacture of crystalline citric acid, it involves the introduction of a foreign ion as an additive into a solution to be treated.

The present invention provides a process for reducing the concentration of microbial cells in a flowable fluid comprising the steps of:

a. contacting the flowable fluid with at least one membrane which is permeable to the fluid portion of the flowable fluid and impermeable to microbial cells or enzymes thereby separating the flowable fluid into a fluid permeate free from microbial cells or enzymes and a flowable retentate containing microbial cells or enzymes, b. introducing fluid permeate and flowable retentate into adjacent compartments of an electrolytic cell containing a cathode in a cathode compartment and an anode in an anode compartment, said adjacent compartments being separated from each other by a cation permeable membrane and being separated from the cathode compartment and the anode compartment by bipolar membranes aligned such that the anolyte permeable surfaces of each are proximal to the anode, the fluid permeate being introduced into the more electronegative compartment, the flowable retentate being introduced into the more electropositive compartment, c. urging an electric current to flow through said cell, thereby reducing the pH of said flowable retentate and increasing the pH of the fluid permeate, d. withdrawing flowable retentate having a reduced pH from the more electropositive compartment and maintaining said flowable retentate at a sufficient temperature and for a sufficient time to reduce the concentration of viable microbial cells and enzymes therein, e. withdrawing fluid permeate from the more electronegative compartment and combining said fluid permeate with flowable retentate from step (d) to reconstitute the flowable fluid with a reduced concentration of viable microbial cells or enzymes.

The present invention has an added advantage in that ions are transported from retentate in an intermediate compartment through a cation permeable membrane into permeate solution in an adjacent intermediate compartment. Consequently, the chemical composition of flowable fluid is exactly the same after treatment as before treatment.

The pH of the flowable retentate withdrawn from the intermediate compartment can be reduced to any desired amount to obtain the desired degree of interactivation of microbial cells ("D value") at any convenient combination of time and temperature. One skilled in the art will readily be able to select these conditions from well known sources, such as the Sterilization Standards Committee of the Association for the Advancement of Medical Instrumentation. Desirably, the pH will be reduced to between 2 and 4.5.

For the purpose of this invention a flowable retentate can be urged to flow through conduit means and can conduct an electrical current, by transfer of ions when subjected to an electric potential gradient, the flowable fluid electrolyte may contain, in addition to microbial cells and enzymes, solids, colloids, gases and the like and may have a very high viscosity. Both a flowable fluid and a flowable retentate, for the purpose of this invention, are aqueous electrolytes, or aqueous fluids which can conduct direct current by movement of ions; both can be urged to flow through conduits and the like. A flowable fluid or a flowable retentate may contain viable or inactivated microbial cells and solids, such as pulp in a fruit juice, or fibers and cell fragments in tomato paste. Exemplary flowable fluids include sugar syrups, fruit juices, vegetable juices, sauces, polymer latices, aqueous emulsions, slurries and the like. Desirable comestible flowable fluids include sugar syrups, such as soft drink concentrates, fruit juice such as orange, apple, cranberry, grape, lemon, grapefruit and lime juices, and vegetable juice such as tomato, celery, and sauerkraut juices.

The best mode of practicing the invention will be understood by one skilled in the art by reference to FIG. 1.

FIG. 1 shows an embodiment of the invention employing module 10 partitioned into two compartments 10A and 10B by membrane 14. Inlet conduit 101 directs flowable fluid from a source (not shown) into compartment 10A. Module 10 is fitted with two effluent conduits, retentate effluent conduit 102 from compartment 10A and permeate effluent conduit 103 from compartment 10B and conduit 104 from compartment 10A. Conduit 102 connects to electrolytic cell 22 at intermediate compartment 31 which is separated from anode compartment 30 containing anode 20 by bipolar membrane 11. Conduit 103 directs permeate from compartment 10B of module 10 to cell 22 at compartment 32 which is separated from permeate intermediate compartment 31 by cation permeable membrane 12. Optionally, compartment 32 may contain a cathode, but preferably is separated from cathode compartment 33 containing cathode 33 by bipolar permeable membrane 13. Effluent conduit 104 from intermediate compartment 31 directs retentate into heat exchange means 40. Effluent from heat exchanger means 40 is withdrawn by product conduit 106, and retentate intermediate compartment 32 is connected by effluent conduit 105 to product conduit 106. Membranes 11 and 13 are aligned so that the anion permeable surfaces 13B and 11B are proximal to anode 20.

In operation, flowable fluid is directed into compartment 10A of module 10 by conduit 101 from a source (not shown) contacting membrane 14. Part of the flowable fluid passes through membrane 14 as sterile permeate and the balance, as retentate is directed by conduit 102 into and through intermediate compartment 31. Concomitantly, permeate from compartment 10B is directed by conduit 103 into compartment 32 of cell 10. Anode compartment 30 and cathode compartment 33 both contain an electrolyte such as potassium hydroxide, potassium phosphate or phosphoric acid. Electricity is urged from anode 20 to cathode 21 through membranes 13, 12 and 11, and compartments 30, 31, 32 and 33 by transfer of ions. At bipolar membrane 11 water is dissociated into hydrogen ions which are transferred into compartment 31 through membrane surface 11A. Similarly hydroxyl ions are transferred through membrane surface 13B into compartment 32 and hydrogen ions are transferred through membrane 13A into compartment 33. Cations, such as hydrogen ions and potassium ions are concomitantly transferred from compartment 31 into compartment 32 through cation permeable membrane. Retentate in compartment 31 increases in hydrogen ion content lowering the pH therein and permeate in compartment 32 decreases in hydrogen ion content, raising pH therein. Retentate with lowered pH is directed from intermediate compartment 31 through conduit 104 into heat exchanger 40 where it is maintained for a time at a sufficient temperature to reduce the concentration of microbial cells therein. Effluent retentate is directed from heat exchanger means by product conduit 106 where it is joined by effluent from cell 32 directed through conduit 105 where it forms reconstituted flowable fluid containing a reduced concentration of microbial cells.

Alternatively, a portion of the flowable fluid could be directed by parallel conduits into alternate intermediate compartments where the pH could be lowered and after heating could be directed by parallel conduits into alternate intermediate compartments where the pH could be raised.

One skilled in the art will recognize that the electrolytes in the anode, cathode and electrolyte compartments will act as "concentration cells" and affect the voltage drop between the compartments. Consequently one would desirably select an electrolyte containing ions which would minimize the voltage drop and provide sufficient conductivity of the electrolyte.

EXAMPLE 1

Orange juice is urged as feed into the apparatus of FIG. 1 through line 101. It is separated by an ultrafiltration membrane into a retentate containing pulp and a permeate. The retentate and permeate are directed concomitantly into compartments 31 and 32 respectively. The pH of the retentate is decreased by 0.7 while the pH of the permeate is increased by 0.7. On emergence from the compartment the retentate is maintained at a temperature sufficient to inactivate microbial cells and enzymes in 3 minutes. Subsequently, the retentate is recombined with the permeate reconstituting the initial orange juice with the same pH as the feed. The enzymes and microbial cells are now inactivated.

We claim:

1. A process for reducing the concentration of microbial cells in a flowable fluid comprising the steps of:
   a. contacting the flowable fluid with at least one membrane which is permeable to the fluid portion of the flowable fluid and impermeable to microbial cells or enzymes thereby separating the flowable fluid into a fluid permeate free from microbial cells and enzymes and a flowable retentate containing microbial cells and enzymes,
   b. introducing fluid permeate and flowable retentate into adjacent compartments of an electrolytic cell containing a cathode in a cathode compartment and an anode in an anode compartment, said adjacent compartments being separated from each other by a cation permeable membrane and being separated from the cathode compartment and the anode compartment by bipolar membranes aligned such that the anolyte permeable surfaces of each are proximal to the anode, the fluid permeate being introduced into the more electronegative compartment, the flowable retentate being introduced into the more electropositive compartment,
   c. urgng an electric current to flow through said cell, thereby reducing the pH of said flowable retentate and increasing the pH of the fluid permeate,
   d. withdrawing flowable retentate having a reduced pH from the more electropositive compartment and maintaining said flowable retentate at a sufficient temperature and for a sufficient time to reduce the concentration of viable microbial cells and enzymes therein,
   e. withdrawing fluid permeate from the more electronegative compartment and combining said fluid permeate with flowable retentate from step (d) to reconstitute the flowable fluid with a reduced concentration of viable microbial cells and enzymes.

2. The process of claim 1 wherein the flowable fluid is selected from the group consisting of orange juice, grapefruit juice, lemon juice, lime juice, apple juice, cranberry juice, grape juice and tomato juice.

* * * * *